Dec. 19, 1939.  K. V. HART  2,183,563
FABRICATED STRUCTURE
Filed Aug. 26, 1937  4 Sheets-Sheet 1
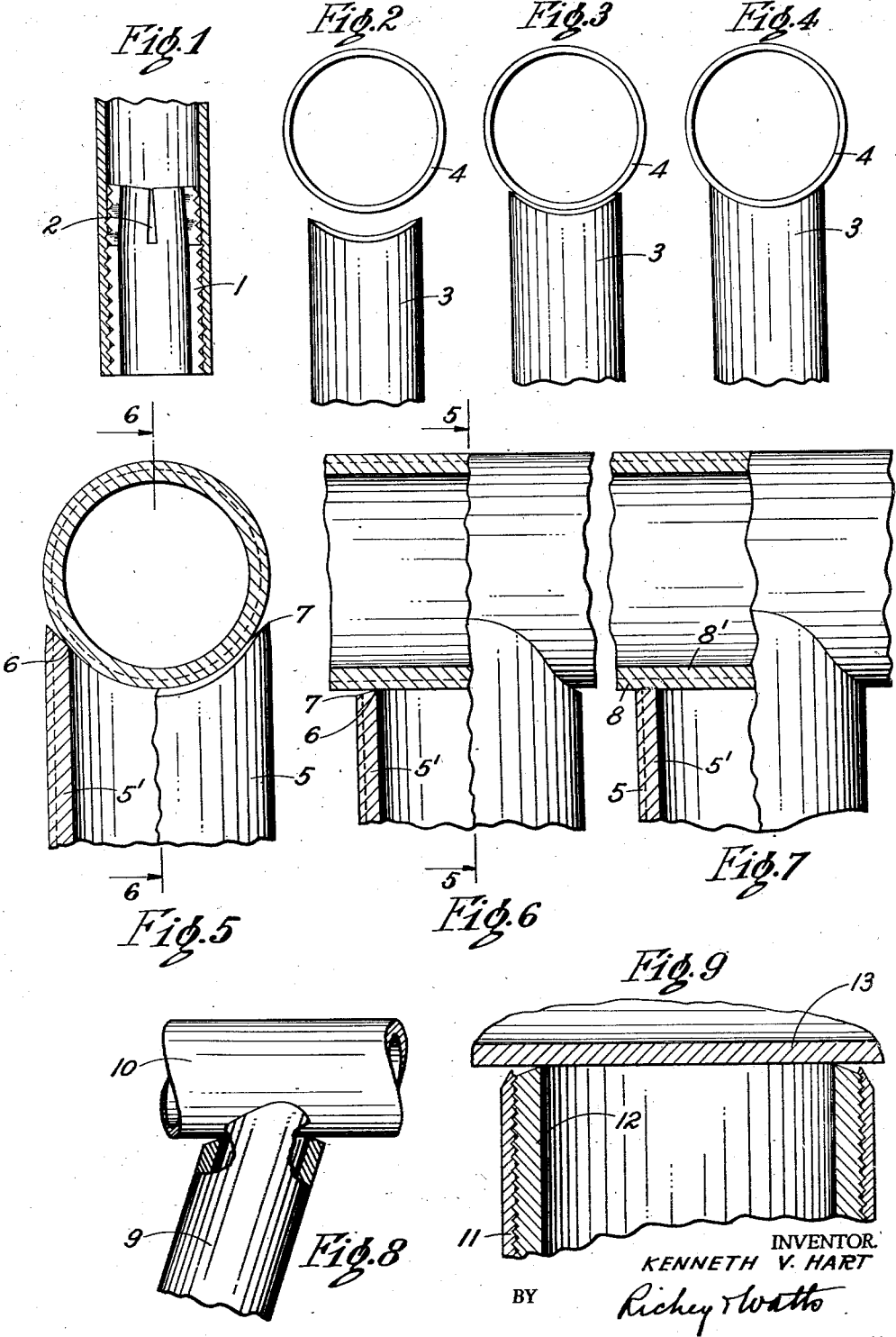
INVENTOR.
KENNETH V. HART
BY
Richey & Watts
ATTORNEYS

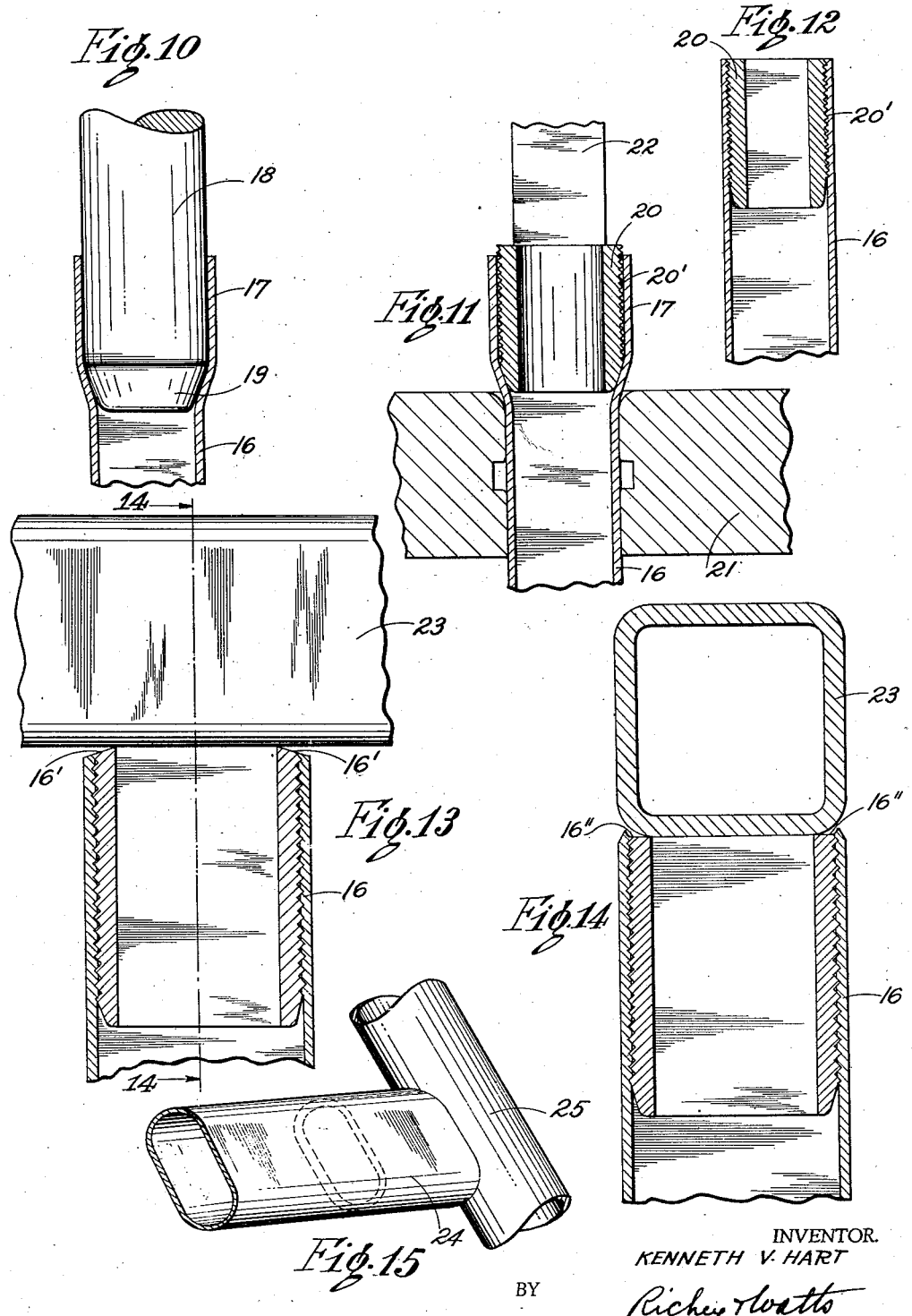

Dec. 19, 1939.  K. V. HART  2,183,563
FABRICATED STRUCTURE
Filed Aug. 26, 1937  4 Sheets-Sheet 3
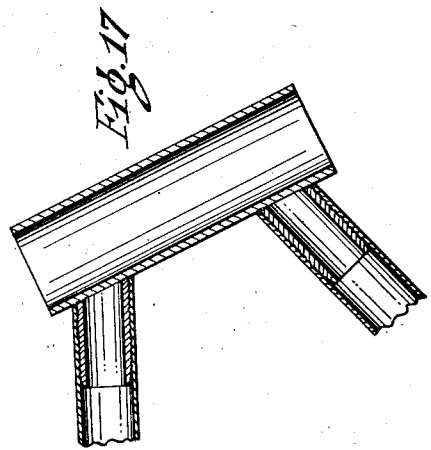
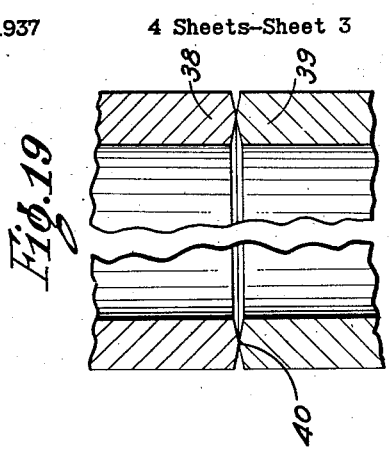
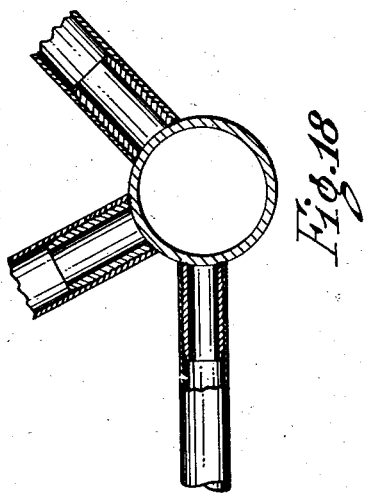
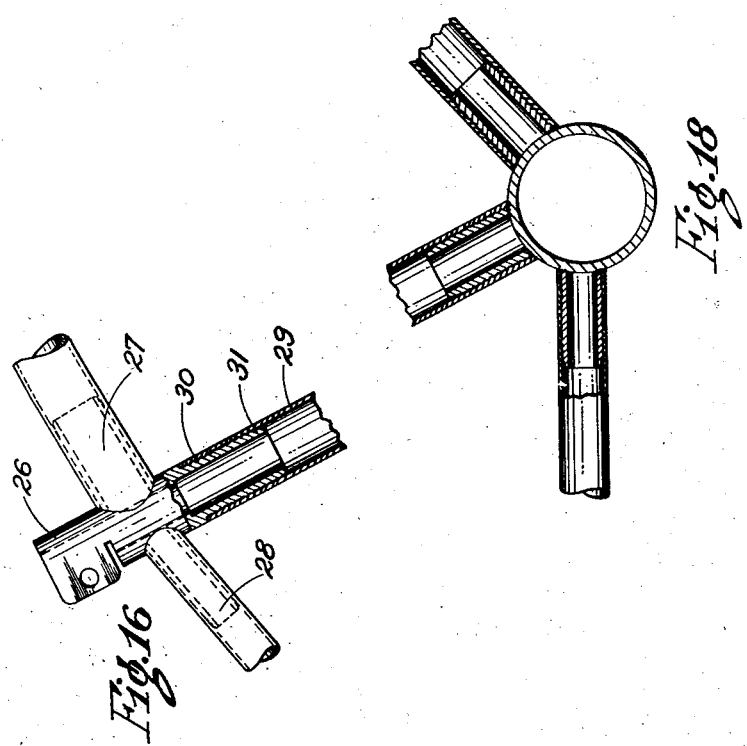
INVENTOR.
KENNETH V. HART
BY
Richey & Watts
ATTORNEYS Dec. 19, 1939.　　　K. V. HART　　　2,183,563
FABRICATED STRUCTURE
Filed Aug. 26, 1937　　　4 Sheets-Sheet 4
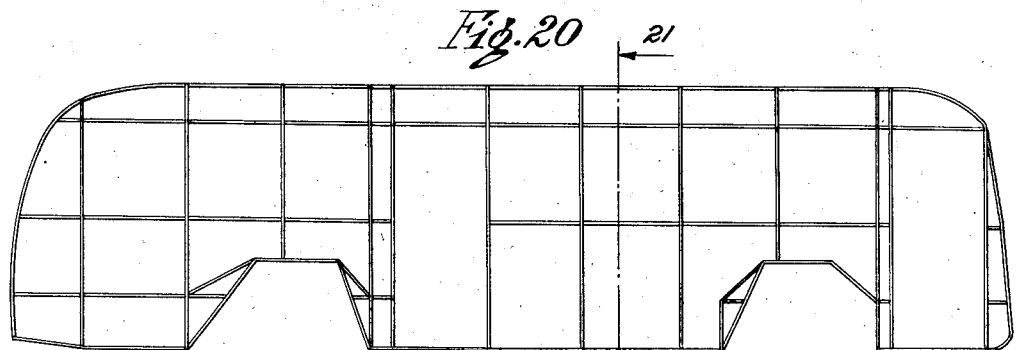
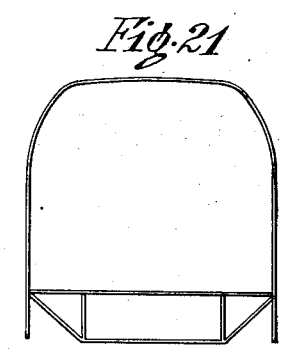
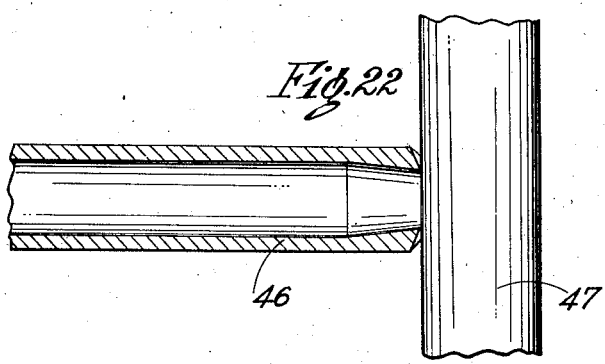
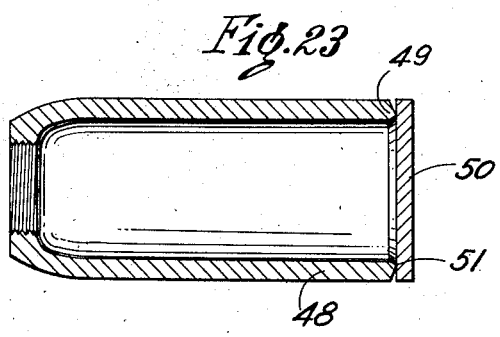
INVENTOR.
KENNETH V. HART
BY
Richey & Watts
ATTORNEYS Patented Dec. 19, 1939

2,183,563

UNITED STATES PATENT OFFICE 2,183,563

FABRICATED STRUCTURE

Kenneth V. Hart, Cleveland, Ohio

Application August 26, 1937, Serial No. 161,072

5 Claims. (Cl. 287—54)

This invention relates to tubular construction and more particularly to an improved form of joint between an end of a tubular member and another member and to tubular structures incorporating such joints.

The present application contains subject matter which has been divided out of my co-pending United States patent applications, Serial No. 1,102, filed January 10, 1935 and Serial No. 68,785, filed March 13, 1936, now Patent No. 2,091,982 of September 7, 1937, and in addition contains certain subject matter not disclosed in said applications. This application may, therefore, be considered to be a continuation-in-part of said co-pending applications.

In structural fabrication the practical use of metallic tubing has heretofore been limited by the lack of a strong, sightly and economical joint between the ends of tubular members and other metallic members. The prior art joints had many disadvantages. For example, they had excess metal which in many cases had to be removed before the article was ready for use and the operations for removing such metal were difficult and expensive.

Prior welded tube structures, as they came from the welding operation, were often warped, the joints were surrounded by considerable quantities of excess metal and the original physical properties of the material of the tubes had been changed and impaired. Correction of the warpage was quite difficult in some instances and involved a separate operation. Removal of the excess metal at the joints was difficult and expensive and involved the danger that some of the tube metal would be removed with resultant thinning of the tube and consequent weakening of the structure. The change in physical properties resulted in joints which were not as strong as the original metal of the tubing. In order to insure adequate strength at the joints, resort was often had to thicker walled tubes than those actually required by the service demands which would be imposed on the stretches of tubes between joints. The prior welded structures were confined to a few materials which were the only ones considered to be readily weldable. Even with such materials highly skilled operators were required to make the welded structures. These various factors have limited full utilization of metallic tubing in welded structures. In many cases lighter tubing would have possessed adequate strength and if it could have been used would have saved weight and expense in the welded structures and would have imparted desirable shock-absorbing qualities to the structure.

The present invention overcomes these many disadvantages and makes it possible to make welded structures consisting of metal tubes of such sizes as are adequate to meet the expected service demands and to employ welded joints between such tubing which are not only strong enough to meet the expected service demands but may be made free from excess metal and without material change in the physical properties of the metal of the tube. The present invention makes it possible to provide such structures without requiring highly skilled operators and makes possible the provision of welded structures composed of materials which were heretofore considered to be either difficultly weldable or non-weldable. Furthermore, the welding operation does not injure or impair the finish or surface configuration possessed by the tubing before welding.

My improved tube joints are formed by means of the methods described in my said co-pending applications Serial No. 1,102 and Serial No. 68,785. The preferred procedure includes the steps of shaping the end of the tubular metal member, which is to be incorporated in the joint, in such a manner that a relatively narrow line or zone of contact will be formed between the end of the tubular member and the article to which it is to be joined. This line of narrow area of contact is preferably spaced inwardly from the outside edge of the end of the tubular member. In many instances I find it desirable, as where thin walled tubing or tubing of difficultly weldable material is employed, to use in the tube-end a tubular reinforcing insert, which may be of the same material as the tube itself or may be of some other material. Where the tube material is difficultly weldable, the insert is desirably of more weldable material. As is described in my said co-pending applications, these reinforcing members are preferably knurled or otherwise roughened on the outer surface and inserted into the tube end and then the projecting points formed by the knurling or roughening are caused to be impressed into the inner surface of the tube either by expanding the reinforcing member or by drawing or swaging the tubular member down over such member, to give a good mechanical and electrical contact therebetween. The reinforced end is then shaped as outlined above, to give a narrow contact area, preferably on the insert, which conforms to the other member of the joint.

The joint is completed by bringing the parts into engagement at the small contact area mentioned above and applying, thru electrodes connected to the tubular member and to the member to which it is to be joined, a heavy current of very short duration between the parts while they are pressed together with heavy follow-up pressure. In this manner, a resistance surface weld is formed almost instantaneously.

A microscopic examination of the above described welds made by my improved process which is described and claimed in my said copending U. S. patent applications indicates that the welding has taken place at the surface portions of the opposed metal parts and has been confined substantially to the surface portion of those parts. In my structure no material burr or flash metal formation extends outwardly beyond the outer surface of the end of the tubular member which is welded to another metal member.

Furthermore, the "heat lines," i. e., the lines between grains which have been affected and those which have not been affected by the welding temperature, are located in the bodies of the two joined pieces of metal a distance of a few hundredths of an inch, for example, 3/100 to 5/100 of an inch, from the weld line between the opposed surfaces. Thus, the weld is definitely a "surface" weld as the term is known and recognized in the art and having been made by resistance welding is a "resistance surface weld." My improved joints are characterized by the fact that the actual joining of the parts is by a resistance surface weld.

The term "annular" as used herein in reference to welds or members is intended to mean and include a closed or endless figure, such as a circle, oval, rectangle or other polygonal shape, and one of which all parts do not necessarily lie in the same plane.

The procedure by which my improved joints may be formed has been rather briefly outlined above and for a more detailed explanation thereof reference is made to my said co-pending U. S. patent applications, Serial No. 1,102, filed January 10, 1935 and Serial No. 68,785, filed March 13, 1936.

In the accompanying drawings in which I have illustrated a number of structures embodying the present invention.

Figure 1 is a vertical cross-section of a reinforced tube end, which may be used in practicing the present invention, the inner end of the insert being slotted to permit of a progressive decrease in the engagement of the insert with the tube, thus progressively decreasing the degree of reinforcement imparted to the tube.

Figure 2 illustrates two tubes of different diameters shaped and disposed preparatory to welding.

Figure 3 illustrates the tubes of Figure 2 in the positions they assume just prior to welding.

Figure 4 illustrates the tubes of Figures 2 and 3 after welding has been completed.

Figure 5 is an enlarged view, similar to Fig. 3, of a pair of tubes of the same diameter just prior to welding.

Figure 6 is a view taken on line 6—6 of Figure 5.

Figure 7 is a view similar to Figure 6 but illustrating the tubular joint after welding has been completed.

Figure 8 illustrates a pair of tubes in before-welding position for an acute angle joint, the parts being broken away to show the tube end in section.

Figure 9 is a before-welding view, greatly enlarged, of a pair of tubes in welding position, one tube having its end formed for welding and having a lip formed or rolled in at its outer circumferential edge.

Figure 10 illustrates a square tube end with a round expanding tool in position after expanding the end of the tube preparatory to inserting a reinforcing insert.

Figure 11 diagrammatically illustrates a square tube, the end of which has been expanded by a round tool and into which a cylindrical knurled insert has been inserted, the tube being disposed in a die having a square opening and arranged to be forced through the die to reduce the flared end to original size and shape and cause the knurled projections of the insert to embed themselves in the tube wall.

Figure 12 is a vertical cross-sectional view of a finished tube end with insert in position prior to having the end formed for welding.

Figure 13 is a cross-sectional view of a pair of rectangular tubes in position for welding.

Figure 14 is a view taken on line 14—14 of Figure 13.

Figure 15 illustrates a structure of the invention including a round tube and an oval tube.

Figure 16 illustrates a bicycle seat post support structure embodying my invention.

Figure 17 illustrates a bicycle head structure.

Figure 18 illustrates a bicycle crank hanger. The parts shown in Figures 16, 17 and 18 are disposed in the same relative positions as in a complete bicycle frame.

Figure 19 is a before-welding view of abutting ends of tubes of the same diameter to be welded together.

Figure 20 is an illustrative representation of a bus frame structure composed of tubular members connected by my improved joints.

Figure 21 is a cross-section taken on line 21—21 of Figure 20.

Figure 22 is a before-welding view of one of my tubular joints in which the end of the shaped tube has been upset to increase its thickness.

Figure 23 is a longitudinal cross-section through a shell illustrating the end plate at the rear end of the shell in before-welding position, the contacting ridge on the end of the shell wall being spaced from both inner and outer surfaces of the shell but being closer to the inner than the outer edge.

Referring now to the drawings, Figure 1 illustrates one embodiment of my reinforcement of a tube end. A tubular insert 1 having a knurled or otherwise roughened outer surface has been secured in the tube end by causing the projections of its surface to become embedded in the inner wall of the tube. The inner end of the insert may be tapered or as is shown in Fig. 1 may be slotted as at 2 to permit the inner end to collapse, to progressively reduce the degree of its engagement with the tube wall. In this way transfer of the load from the rigidly reinforced portion of the tube to the unreinforced portion may be distributed over a considerable length of the tube to avoid localization of stress. The inserts may advantageously be made of readily weldable metal, especially when the tube is of difficultly weldable metal, and the points of the projections may be hardened to facilitate embedding in the tube wall.

Figures 2, 3 and 4 illustrate diagrammatically three steps in the welding procedure by which my improved joints and structures may be produced. In Figure 2 the tube 3 has had its end shaped so that both the inner and the outer circumferential edges of its end-face will substantially conform to the surface of the tube 4, but with the inner edge raised a slight distance to form a narrow annular zone of initial contact with the surface of the tube 4. An insert, not shown, has preferably been inserted in the tube 3, so that the narrow annular zone of contact between the end of the tube 3 and the surface of the tube 4 is provided at the inner circumferential edge of the insert. Figure 4 shows the finished joint and illustrates how, since the joint is formed without any flash or burr at the outer edge of the tube 3, the original surface of the tube 3 extends up to the surface of the tube 4.

In Figures 5, 6 and 7 the formation of the improved structure including a joint and tubes of the same outside diameter is illustrated on a somewhat enlarged scale. The inserts in the tubes are indicated by the dotted lines. Here again, the tube end is shaped with its inner circumferential edge raised to form a line 6 of initial contact, and I have found that where the abutting tube 5, together with its insert, has a wall thickness of about 1/8" I can obtain satisfactory results when the contact line 6 is raised about .030" to .040" above the outer edge 7 of the tube end as viewed in Figure 6. Preferably the clearance between the outer circumferential edge 7 and the surface against which the tube end abuts, measured in the direction of application of the pressure by which the parts are pressed together during welding, is maintained at a constant value around the tube circumference. As shown in Figure 7, which illustrates a finished joint, the weld is effected substantially completely across the end surface of the tube 5 and its insert 5'. By causing current to flow between the insert 8' and the tube 8 the two may be welded together.

In making a joint such as that illustrated in Figure 7, the current will usually be applied to the tube 8 by an electrode which engages an upper portion of the tube 8, so that the current will be carried mostly by such tube 8.

My improved form of welded joint is readily adaptable to the connection of the tubular members at various angles and an oblique angle joint is shown in Figure 8 between tubes 9 and 10. It will be understood that wherever the strengthening and/or stress distributing characteristics of inserts is desired, as is usually the case with thin-walled tubing, such inserts may be secured in the tubes in the manner described or in any other suitable manner. In some of the drawings, as in Fig. 8, I have illustrated joints between tubes having relatively thick walls and without inserts.

In Figure 9 the tube 11 has an insert 12 and is shown in position to be welded to the side of a tube 13. In some cases I have found that a better finished welded joint can be obtained when a very small lip or rim 14 is formed at the outer circumferential edge of the tube 11. As is clearly seen in Figure 9, this lip 14 preferable does not extend up as high as the contact ridge 15 and does not make contact with the tube 13 until late in the welding operation, perhaps even after the current has been shut off, although the welding operation is so rapid that it has been impossible to determine when such contact does occur. If desired, such lip 14 may, by suitable adjustment of the welding conditions, be made to roll outwardly to form a slight fillet at the meeting line of the tube surfaces. The lip 16 may be formed by a simple rolling operation on the outer tube-edge after the end has been shaped for welding.

It will be understood that this rolling in of the outer circumferential edge of a tube end is not necessary in all cases but I have found it effective to insure a tight engagement of the tubes at the outer edge of the weld and where thin wall tubing is being used to promote welding of the complete outer tube as well as the insert to the abutting member.

My knurled or roughened inserts may be secured in the tube ends with the desired good electrical and mechanical contact in various ways. In Figures 10, 11 and 12 I have illustrated the steps of one preferred procedure as applied to square tubes. In Figure 10 the square tube 16 has had its end 17 forced to circular shape and expanded by the action of forcing the tapered end 19 of the round plunger member 18 axially into such tube-end.

As illustrated in Figure 11, an insert 20, which has its outer surface knurled and its lower end tapered and which preferably has a sliding fit in the round expanded end 17 of the tube 16, is positioned in the tube and the squared portion of the tube 16 is inserted in a square die 21. The plunger 22 is then applied to push the round insert 20 and the rounded end 17 of the tube down through the square die 21. The resulting product, as shown in Figure 12, has been returned to its original square dimensions. The insert 20 has also been formed into square shape and the projections 20' of its knurled surface have been embedded in the wall of the tube 16. Procedures similar to this may be utilized to secure inserts in tubular members of any cross-sectional shape.

After applying the insert to the tube 16, the end of such tube is shaped for the welding step. When a joint is to be made with the side of another square tube of the same size and when the tubes have rounded corners, the ends of two opposite walls are beveled and the ends of the other two walls are cut off square on a level with the upper edges of the beveled walls. Preferably, the outer edges of the squared wall-ends are rolled to form an upstanding lip similar to the lip 14 of Figure 9. The tubes are then assembled as shown in Figure 13 so the beveled wall-ends 16' are transverse to the side of the other tube and the squared wall-ends 16" are parallel to the center line of the other tube. The squared wall-ends will then make line contact with the surface of the tube 23 where the flat side joins the curved corner (see Fig. 14), and the beveled wall-ends make line contact with the flat side of the tube 23 at the upper edge of the bevel (see Fig. 13). A weld may then be made in the manner already outlined herein.

Figure 15 illustrates one of my improved structures, including my improved joint connecting the end of an oval tube 24 to the side of a round tube 25.

Figures 16, 17 and 18 illustrate in separated views certain portions of a particular commercial structure—a bicycle frame—embodying my invention. In Figure 16, the heavy tubular post 26 is the support for the seat post of the bicycle. The tube 27 extends forwardly to the steering post of the bicycle and the tube 28 is one of a pair (superimposed in this view) which extends rearwardly to the rear wheel support. The downwardly extending tube 29 joins the sprocket bearing support in the usual manner. In this form of my invention the tubular post 26 has a reduced portion 30 with a knurled surface and a tapered lower end. The projections of the knurling are embedded in the wall of the tube 29 to form a firm joint therebetween, which may be accomplished by swaging or drawing the tube down onto the knurled part of the member 26 in a manner similar to that illustrated in Figs. 10 to 12. Oblique angular joints connect the tubes 27 and 28 to the seat post support 26. Preferably, the post 26 is of heavy gauge steel and the tubes 27, 28 and 29 are either of thin-walled steel or of aluminum alloy tubing, to reduce weight. In either case, the ends of the tubes 27 and 28 desirably contain inserts to strengthen the joints and distribute any stresses which may be imposed on such tubes at and near the joints. When the tubes 27, 28 and 29 are of aluminum, the presence of the inserts at the joints in accordance with my invention makes such joints possible. The presence of my joints makes it possible to have a strong frame with the advantages of light weight tubular structural members; for not only are the joints simple, practical, and themselves relatively light in weight, but they co-operate with the tubular members by their stress distributing characteristics to permit using exceptionally light weight tubing without loss of necessary strength. Moreover, the use of my joints greatly reduces the cost of manufacture, and gives a neatness to the structure by the fact that the cylindrical surfaces of each tube extend completely to the cylindrical surfaces of the joining tubes.

Figures 17 and 18 illustrate respectively bicycle head and crank hanger assemblies in which the tubular frame members are secured to other tubular members by my improved joints.

The abutting ends of two tubular members may also be connected as is shown in Figure 19 in which both tube ends are beveled as at 38 and 39 and engage in a substantial line or ridge contact at 40.

Figures 20 and 21 diagrammatically illustrate, as an example of fabricated structures embodying my invention, a form of tubular bus frame and body construction. Airplanes, automobiles and other vehicle frame structures are other examples.

In Figure 22 the end of the tube 46 has been increased in thickness by upsetting and has then been shaped to conform to the tube 47 to which it is to be welded. In this form of joint additional strength is imparted to the welded connection by the increase in the cross-section of the tube 46 instead of by the presence of an insert as is shown in a number of the other figures of the drawings.

Figure 23 illustrates another adaptation of my improved welded joint between metal parts. In this instance a hollow shell 48 has its end formed as shown at 49. The end plate 50 is illustrated in position to be secured thereto by my improved welded joint. In this instance the contact ridge 51 on the end of the shell tube 48 is disposed closer to the inner surface of the shell than to the outer surface. By varying the position of this contact ridge 51 toward or away from the inner surface of the shell a joint can be formed between the end of the shell and the plate 50 which will be free from external flash but in which, as is considered desirable in this form of joint, a small fillet of upset metal may be formed at the inner contact line.

It will be apparent from the foregoing disclosure, that many advantages are obtainable by the present invention. It makes possible the production of structures consisting of tubes connected together by welded joints which are clean, sightly and free from excess metal as they come from the welding operation. It permits the production of tubular structures in which tubes having the necessary strength intermediate their ends are used and with which reinforcements are present at the joints where greater strength is required. The joints of this invention are as strong as the metal of the tubes.

Such structures have the necessary strength at every place and possess desirable shock-absorbing qualities, due to the somewhat flexible nature of the parts of the tubes intermediate their ends. Such structures will "give" somewhat when subjected to shocks, thereby cushioning or absorbing the shocks and in doing so do not impose on the joints stresses beyond their strengths.

This invention makes possible the production of welded structures wherein tubes composed of difficultly weldable metal are used, and wherein tubes of different metals are used.

The various operations in making a welded structure or a joint embodying the present invention, are performed by machinery which can be operated by operators having little or no skill.

Structures consisting of several tubes and including several joints may be made quickly and cheaply. Several joints may be welded in one set-up, thus avoiding separate operations and intermediate handlings, and correspondingly reducing the costs. The fact that the joints do not have excess metal further cheapens the cost of manufacture as compared with prior practice and avoids all danger that part of the tubes may be removed when excess metal is removed.

The almost instantaneous welding of the joints avoids subjecting the metal to high temperatures for prolonged periods, thereby avoiding damage to the metal and warping of the structure. Avoidance of warpage makes straightening unnecessary and avoids the setting up of strains incident to straightening.

The almost instantaneous welding operation does not impair or injure the finish of, or configuration on, the surfaces of the tubes.

I prefer to use tubing having a longitudinal resistance surface weld for the tubular members of structures embodying my invention, because such tubing is substantially uniform in wall thickness, is free from scale on its inner and outer surfaces, possesses a cold worked structure and the metal at and adjacent to the longitudinal weld is of substantially the same characteristics as the body metal of the tube and may be readily re-welded in producing my joints.

I have illustrated and described in considerable detail a number of examples of my improved joint and several examples of rigid tubular structures fabricated with the use of my improved joints. It will be understood by those skilled in the art that modifications of these examples may be made without departing from the spirit of my invention which give the advantages of my invention. I do not, therefore, wish to be limited to the particular embodiments of my invention herein shown and described, but claim all forms thereof coming within the scope of the appended claims.

I claim:

1. A structure including a tubular metal member, an opposed metal member and a resistance surface weld uniting an end of said tubular member to said opposed member, said weld being characterized by the absence of material flash metal extending beyond the outer surface of said end of said tubular member and by the heat lines being disposed a distance away from the weld line less than approximately one-half of the wall thickness of the tubular member adjacent the weld.

2. A structure including a tubular metal member, a metal reinforcing member at one end of said tubular member, an opposed metal member and a resistance surface weld uniting the ends of said tubular member and reinforcing member to said opposed member, said weld being characterized by the absence of material flash metal extending beyond the outer surface of said ends of said tubular member and reinforcing member and by the heat lines being disposed a distance away from the weld line less than the wall thickness of the tubular member and reinforcing member adjacent the weld.

3. A structure including a tubular metal member, an opposed metal member and a resistance surface weld uniting an end of said tubular member to said opposed member, said weld being characterized by the absence of material flash metal extending beyond the outer surface of said end of said tubular member and by the heat lines being disposed a distance away from the weld line less than the wall thickness of the tubular member adjacent the weld.

4. A structure including two tubular metal members in end-to-side position, and a resistance surface weld uniting the end of one of said members to the curved side of the other of said members, said weld being characterized by the heat lines being disposed a distance away from the weld line less than the wall thickness of the tube whose end is welded.

5. A structure including a tubular metal member, an opposed metal member and a resistance surface weld uniting an end of said tubular member to said opposed member, said weld being characterized by the heat lines being disposed a distance away from the weld line less than the wall thickness of the tubular member adjacent the weld.

KENNETH V. HART.